(12) United States Patent
Perez Cordoba

(10) Patent No.: US 10,377,668 B2
(45) Date of Patent: Aug. 13, 2019

(54) ROADWAY MATERIALS BASED ON DRILL CUTTINGS

(71) Applicant: Racional Energy & Environment Company, Conroe, TX (US)

(72) Inventor: Ramon Perez Cordoba, Conroe, TX (US)

(73) Assignee: Racional Energy & Environment Company, Conroe, TX (US)

( * ) Notice: Subject to any disclaimer, the term of this patent is extended or adjusted under 35 U.S.C. 154(b) by 50 days.

(21) Appl. No.: 15/573,365

(22) PCT Filed: Apr. 26, 2016

(86) PCT No.: PCT/US2016/029287
§ 371 (c)(1),
(2) Date: Nov. 10, 2017

(87) PCT Pub. No.: WO2016/182722
PCT Pub. Date: Nov. 17, 2016

(65) Prior Publication Data
US 2018/0134619 A1    May 17, 2018

Related U.S. Application Data

(60) Provisional application No. 62/160,119, filed on May 12, 2015.

(51) Int. Cl.
*C04B 18/12* (2006.01)
*B09B 3/00* (2006.01)
*B09C 1/06* (2006.01)
*C04B 16/06* (2006.01)
*C04B 18/24* (2006.01)
*C04B 28/04* (2006.01)
*C09K 17/14* (2006.01)

(52) U.S. Cl.
CPC ............ *C04B 18/12* (2013.01); *B09B 3/0083* (2013.01); *B09C 1/06* (2013.01); *C04B 16/0625* (2013.01); *C04B 18/248* (2013.01); *C04B 28/04* (2013.01); *C09K 17/14* (2013.01)

(58) Field of Classification Search
CPC ... C04B 18/12; C04B 18/248; C04B 16/0625; C04B 28/04; B09B 3/0083; B09C 1/06; C09K 17/14
USPC .......................................... 404/17–28, 72–86
See application file for complete search history.

(56) References Cited

U.S. PATENT DOCUMENTS

| | | | | |
|---|---|---|---|---|
| 3,076,717 A * | 2/1963 | Minnick | ................ | C09K 17/06 106/710 |
| 4,107,112 A * | 8/1978 | Latta, Jr. | ................ | C09K 17/18 166/195 |
| 6,322,489 B1 * | 11/2001 | Richardson | ............... | B09B 1/00 588/252 |

(Continued)

OTHER PUBLICATIONS

Misra et al., Evaluation of suitability of oil well drill cuttings for road making; Journal of Scientific & Industrial Research; vol. 70; Apr. 2011.

*Primary Examiner* — Raymond W Addie
(74) *Attorney, Agent, or Firm* — Daniel N. Lundeen; Lundeen & Lundeen PLLC

(57) ABSTRACT

A roadway construction material based on treated drill cuttings, a base or sub-base of a roadway comprising treated drill cuttings and water, and methods of making and using the roadway construction material.

24 Claims, 1 Drawing Sheet

(56) References Cited

U.S. PATENT DOCUMENTS

| | | | |
|---|---|---|---|
| 9,410,386 B2* | 8/2016 | Hemmings | E21B 21/066 |
| 2003/0116887 A1 | 6/2003 | Scott | |
| 2003/0167970 A1 | 9/2003 | Polston | |
| 2009/0238643 A1* | 9/2009 | Pomerleau | B09B 3/0041 |
| | | | 404/76 |
| 2009/0250399 A1* | 10/2009 | Pomerleau | B01D 15/00 |
| | | | 210/693 |
| 2014/0072368 A1* | 3/2014 | Hemmings | E21B 21/066 |
| | | | 404/82 |
| 2016/0138349 A1* | 5/2016 | Hale | E21B 21/066 |
| | | | 210/696 |
| 2018/0193775 A1* | 7/2018 | Ross | B01D 21/262 |
| 2018/0340069 A1* | 11/2018 | Steger | B01D 21/262 |

\* cited by examiner

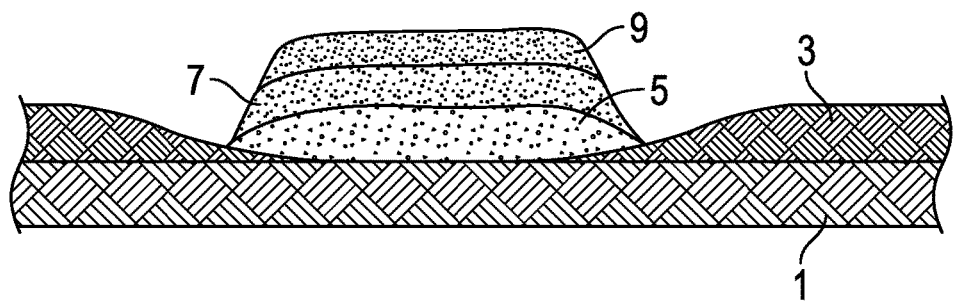

ROADWAY MATERIALS BASED ON DRILL CUTTINGS

CROSS-REFERENCE TO RELATED APPLICATIONS

This application claims priority benefit to my earlier U.S. provisional application No. 62/160,119, filed May 12, 2015, which is herein incorporated by reference in its entirety.

BACKGROUND

The statements in this section merely provide background information related to the present disclosure and may not constitute prior art.

Roadway construction materials must meet certain requirements for strength, stability and other characteristics to be suitable for supporting vehicles or other loads to be carried thereon with sufficient durability to withstand environmental conditions. Suitable materials must be available in sufficiently large quantities for roadway construction since typical roadways may require millions of cubic feet of such materials. Furthermore, suitable roadway materials must meet environmental concerns and regulations.

The physical nature of the oil-based drill cuttings complicates their use as construction materials, which must present structural and physicochemical properties established in regulatory and professional standards for roadway design and environmental management. Numerous attempts have been tried to recover useful and/or readily disposable solids from OBDC by removing oil from the drill cuttings, but with limited success. There exists a need for ways to recover and use solids from OBDC.

There exists a need for sources of suitable and/or improved materials for roadway construction.

SUMMARY

The present disclosure according to some embodiments is directed to compositions, in particular roadway construction material compositions comprising treated drill cuttings, a base or sub-base of a roadway which comprise the treated drill cutting compositions, and methods of forming the compositions and/or making a roadway comprising the compositions.

In embodiments, a roadway construction material composition (the composition) comprises, consists of, or consists essentially of treated drill cuttings and water. In embodiments, the composition comprises greater than or equal to about 30 weight percent plagioclase, has a particle size distribution and plasticity for characterization as a silty sand (SM) according to the Unified Soil Classification System (USCS), and a moisture content sufficient to produce a California Bearing Ratio (CBR) of at least about 60 as determined according to ASTM D 1883 or ASTM D 4429. In embodiments, the moisture content of the composition is from about 10 wt % water to about 20 wt % water.

In embodiments, a roadway comprises a cap, a base, and optionally a sub-base, the base and/or the sub-base comprising a composition comprising treated drill cuttings and having a moisture content sufficient to produce a California Bearing Ratio (CBR) of at least about 60 as determined according to ASTM D 1883 or ASTM D 4429.

In embodiments, a method, comprises treating or processing drill cuttings by direct heating with a combustion gas at a temperature above about 100° C., or 200° C., and recovering treated drill cuttings solids having a particle size distribution and plasticity for characterization as a silty sand (SM) according to the Unified Soil Classification System (USCS), and adjusting a moisture content of the recovered solids to an amount sufficient to produce a California Bearing Ratio (CBR) of at least about 60 as determined according to ASTM D 1883 or ASTM D 4429.

BRIEF DESCRIPTION OF THE DRAWINGS

FIG. 1 is a cross section of a constructed roadway according to embodiments disclosed herein.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments and should not be construed as a limitation to the scope. While the compositions are described herein as comprising certain materials, it should be understood that the composition could optionally comprise two or more chemically different materials. In addition, the composition can also comprise some components other than the ones already cited. In the summary and this detailed description, each numerical value should be read once as modified by the term "about" (unless already expressly so modified), and then read again as not so modified unless otherwise indicated in context.

The following definitions are provided in order to aid those skilled in the art in understanding the detailed description.

For purposes herein, percentages of compositions are expressed as weight percentages (wt %), and are based on the total weight of the composition present, unless otherwise indicated.

As used herein, the term "roadway" refers to a pathway for traffic of vehicles, people, and/or animals, and is intended to encompass urban and ex-urban streets, highways, airport runways, foundations, parking lots, walkways, dikes, railroad tracks, and the like.

For purposes herein, suitable roadway materials and the methods to determine these properties include, but are not necessarily limited to those disclosed by Garnica, P, Gómez, J A, and Sesma, J. A., Ministry of Communications and Transport, Mexican Institute of Transport. (2002), Technical Publication No. 197, "Mecánica de Materiales para Pavimentos", which is fully incorporated by reference herein.

For purposes herein, the "Unified Soil Classification System" (USCS) refers to characterization consistent with ASTM D2487-11, "Standard Practice for Classification of Soils for Engineering Purposes (Unified Soil Classification System)".

For purposes herein, characterization of a composition consistent with a silty sand (SM) refers to a coarse grained composition having more than 50% retained on or above No. 200 (0.075 mm) sieve, wherein 50% of the coarse fraction is a sand which passes through a No. 4 sieve, wherein the sand has >12 wt % fines, but which is a silty sand as opposed to a clayey sand.

"Drill cuttings" as used herein refers to any solid waste material comprising the comminuted rock or mineral particles obtained from subterranean drilling of wells, e.g., wells for obtaining or transporting oil, gas, water, brine, etc.

Oil-based drill cuttings (OBDC), refers to cuttings and other solid waste material (a sorbent) which further include or comprise one or more treatment fluid, which may be aqueous and/or oil-based, naturally occurring and/or synthetic oils, emulsions and/or invert emulsions, lubricants, and/or other processing or drilling aids. Oil-based drill cuttings include the solids or mixtures generally obtained by drilling with an oil-containing drilling fluid. OBDC provide a non-limiting example of a suitable source material that may be treated and utilized for roadway construction material compositions according to one or more embodiments disclosed herein. However, it is to be understood that other materials generally equivalent to OBDC, for example, solids comprising a liquid bound on or within a solid sorbent material may be suitable for use herein.

"Plagioclase" refers to a solid solution series of tectosilicate minerals within the feldspar family. The series ranges from albite to anorthite endmembers having compositions $NaAlSi_3O_8$ to $CaAl_2Si_2O_8$, where sodium and calcium atoms substitute for each other in the mineral's crystal lattice structure, and thus is not limited to a specific chemical composition. Accordingly, the terms plagioclase, feldspar, and plagioclase feldspar are used interchangeably herein unless otherwise specified.

"Treating" and/or "processing" of material refers to any process that chemically or physically alters the properties of the starting material. As used herein, treating or processing does not refer nor imply any specific treatment unless otherwise indicated.

"Thermal processing" refers to treating a material at an elevated temperature at or above 100° C. Thermal processing may further include chemical treatment where the chemical treatment mediates an exothermic reaction.

Thermally processed drill cuttings refers to any drill cuttings that have been processed by heat treatment, for example, at a temperature above about 100° C., which in embodiments may be greater than or equal to about 200° C., or 250° C., or 300° C., or from 200° C. to 1200° C., or from 225° C. to 900° C., or from 250° C. or 300° C. up to 500° C. or 600° C., and/or the like.

In embodiments, heat treatment of OBDC includes direct heating of the drill cuttings by mixing with hot combustion effluent gas, e.g. at 200° C. to 1200° C., which in embodiments may be a low oxygen environment, e.g., less than 1 vol % oxygen, to form a light phase comprising oil and a dense phase, followed by recovering the solids (from the light phase and/or the dense phase) for use herein.

"Chemical processing" refers to contacting a material with one or more reagents to chemically change, alter or modify the material forming a reaction product.

As used herein, "pretreatment" refers to preliminary treatment of a material in one stage before treatment in a subsequent stage.

As shown in FIG. 1, a typical roadway comprises successive layers of constructed materials overlying a sub-grade 1, which is the in-situ natural soil present which provides the surface for roadway construction. Sub-grade is typically exposed by removing indigenous overburden soils 3 e.g., by scraping, grading, compacting, and the like. Subgrades may be compacted before construction of the roadway, and/or may be stabilized by the addition of modifiers, e.g., asphalt, lime, Portland cement, and/or the like.

Roadways may further comprise a plurality of constructed layers or courses, for example, a sub-base course 5, and/or a base-course 7, each comprising specific types of aggregate which are disposed or otherwise placed by spreading and/or compacting, typically to a minimum of 95% relative compaction, to provide the stable foundation over which the surface layer or cap course 9 is directly constructed.

The cap course 9 is the top layer of the roadway, and may include asphalt, concrete, or the like. In embodiments, a roadway may omit the sub-base 5 or the base course 7, or may comprise a plurality of sub-base courses 5, a plurality of base courses 7, or combinations thereof.

Embodiments disclosed herein include compositions and methods to produce various components suitable for use in a roadway, including the sub-base course and/or the base course. In embodiments, the compositions may be suitable for use within the cap course.

In embodiments, a roadway construction material composition comprises treated drill cuttings comprising from about 30 to about 70 wt % plagioclase, having a particle size distribution and plasticity characterization of silty sand (SM) according to the Unified Soil Classification System (USCS), and having a moisture content suitable to produce a California Bearing Ratio (CBR) of at least about 60 as determined according to ASTM D 1883 or ASTM D 4429. In embodiments, the roadway construction material composition comprises from about 10 wt % to about 20 wt % water, based on the total weight of the composition.

In embodiments, the composition consists of, or consist essentially of, the treated drill cuttings and a sufficient amount of water to render the composition having a CBR of at least about 60. In embodiments, the composition comprises less than or equal to about 50 wt % of one or more additives, e.g. granular additives, based on the total weight of the composition, wherein the granular additives are present in an amount such that the composition has a particle size distribution according to the following table:

| Sieve Designation (nominal opening) | Percent passing (wt %) |
|---|---|
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |
| No. 60 (250 μm) | 12-60 |
| No. 100 (0.149 mm) | 12-45 |
| No. 200 (74 μm) | 12-45. |

In embodiments, the treated drill cuttings comprise a processing history comprising contacting oil bearing drill cuttings with a mineral acid to form a peptizate, followed by thermally treating the peptizate by direct contact with a combustion effluent gas, optionally the effluent gas has less than 1 vol % oxygen, at a temperature greater than or equal to about 200° C., under agitation and for a period of time sufficient to form a light phase comprising oil and a solid phase, wherein the treated drill cuttings are recovered from the solid phase.

In embodiments, the composition comprises a leachate level of less than about 100 mg/L barium, less than 5 mg/L lead, less than 1 mg/L selenium, or a combination thereof, determined according to EPA 6010 B/1996.

In embodiments, the composition further comprises from about 0.01 wt % to about 10 wt % of a soil stabilizer, and/or wherein the composition has a CBR of at least about 80, determined according to ASTM D 1883 or ASTM D 4429. In embodiments, the soil stabilizer is selected from the group consisting of lime, fly ash, pozzolan cement, and combinations thereof.

In embodiments, the composition comprises an amount of lime, fly ash, pozzolan cement, or a combination thereof sufficient to produce a CBR of at least about 100, determined according to ASTM D 1883 or ASTM D 4429.

In embodiments, the composition further comprises from about 0.01 wt % to about 5 wt % fibers, based on the total weight of the composition. In embodiments, the fibers have a length from about 1 to 40 cm and an aspect ratio of at least about 10, and/or the fibers comprise polyethylene terephthalate, which may include recycled material, and/or the fibers include bamboo, coconut, palm, sisal, jute, or combinations thereof.

In embodiments, a roadway comprises a cap course, a base course, and optionally a sub-base course, wherein the base course, the sub-base course, or both comprise the roadway construction material composition according to one or more embodiments disclosed herein.

In embodiments, a method comprises processing oil bearing drill cuttings to recover treated drill cuttings comprising from about 30 wt % to about 70 wt % plagioclase and having a particle size distribution and plasticity characterization of silty sand (SM) according to the Unified Soil Classification System (USCS); and adjusting a moisture content of the treated drill cuttings to about 12 wt % to 16 wt % based on the total weight to form a roadway construction material composition having a California Bearing Ratio (CBR) of at least about 60, determined according to ASTM D 1883 or ASTM D 4429.

In embodiments, the processing of the oil bearing drill cuttings, i.e., the processing history of the treated drill cuttings, comprises contacting the oil bearing drill cuttings at a temperature between about 70° C. and about 105° C. with an acidic reagent under shear to obtain a peptizate having an increased surface area and a pH between about 6 and about 8, and combining the peptizate with a combustion effluent gas at a temperature greater than about 200° C. under turbulent conditions in a thermal desorption zone for a period of time sufficient to desorb at least a portion of the oil from the peptizate to form a dilute phase comprising oil vapor and a dense phase comprising the treated drill cuttings.

In embodiments, the method further comprises disposing the roadway construction material composition in roadway construct to form one or more layers of a base course, a sub-base course, or a combination thereof.

In embodiments, the method further comprises blending the treated drill cuttings with 50 wt % or less of a granular additive to form a blended composition having a particle size distribution according to the following table:

| Sieve Designation (nominal opening) | Percent passing (wt %) |
|---|---|
| 3 in. (76.2 mm) | 100 |
| 2 in. (50.8 mm) | 85-100 |
| 1.5 in. (38.1 mm) | 75-100 |
| 1 in. (25.4 mm) | 62-100 |

-continued

| Sieve Designation (nominal opening) | Percent passing (wt %) |
|---|---|
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |
| No. 60 (250 μm) | 12-60 |
| No. 100 (0.149 mm) | 12-45 |
| No. 200 (74 μm) | 12-45. |

In embodiments, the method further comprises blending the treated drill cuttings with a soil stabilizer in an amount effective to form a composition comprising a CBR of at least about 80 determined according to ASTM D 1883 or ASTM D 4429. In embodiments, the soil stabilizer is selected from the group consisting of lime, fly ash, pozzolan cement, and a combination thereof, and the CBR is at least about 100.

In embodiments, the method further comprises blending the treated drill cuttings with from about 0.01 wt % to 5 wt % of fibers.

In some embodiments, the treated drill cuttings are formed from OBDC which has been chemically and/or thermally treated or processed. In embodiments, the OBDC may be chemically treated with an acidic reagent such as a mineral acid, e.g., sulfuric acid, with or without an emulsion breaker such as dodecyl benzene sulfonic acid (DDBSA), prior to or concurrently with the thermal processing. In embodiments, the chemical treating includes peptizing, wherein the ODBC or other substrate is quickly expanded by contacting with one or more mineral acid reagents thereby increasing its volume to facilitate the disintegration or dispersion of agglomerated particles and expose surface area to facilitate the release of liquid in a subsequent thermal desorption step. Peptizing thus includes contacting the substrate with an amount of a mineral acid under high shear conditions within a peptizing zone. In an embodiment, the mineral acid reagent is added to the substrate in an amount sufficient to produce a peptizate having a pH between 6 and 8, preferably a pH between 6.5 and 7.5. The mineral acid may be added at between 1 wt % and 100 wt %, preferably between 2 wt % and 20 wt %, based on the total amount of substrate material present, to produce a peptizate. The acid may be diluted with water to achieve the desired result and/or control, but is preferably added as a concentrate or neat to obtain a higher temperature in the peptizate. Suitable mineral acids include, for example, sulfuric acid, oleum, phosphoric acid, nitric acid, hydrochloric acid, combinations thereof, and the like. In an embodiment, the mineral acid preferably comprises concentrated (98+wt %) sulfuric acid. In embodiments, the mineral acid may be added to the substrate in a peptizing zone, typically a high shear mixing and/or kneading apparatus such as a kneader, a ribbon blender, a paddle mixer, and/or the like.

In embodiments the OBDC may be thermally treated, with or without chemical treatment. In embodiments, the peptizate is transferred into a thermal desorption zone which is in fluid communication with a burner supplying combustion effluent gas. In embodiments, the combustion effluent gas comprises less than 1 vol % oxygen and is supplied to the thermal desorption zone at a temperature greater than 200° C. In embodiments, the thermal desorption zone comprises one or more agitators to create turbulent conditions and promote rapid heat transfer. The peptizate is mixed with the combustion effluent gas under turbulent conditions in the thermal desorption zone to heat the peptizate and desorb at least a portion of the oil from the sorbent material. The mixture exiting the thermal desorption zone is separated into a dilute phase comprising oil vapor from the sorbent, and a dense phase comprising the sorbent.

In an embodiment, the average residence time in the thermal desorption zone of the dense phase is less than or equal to about 5 minutes and the average residence time of the dilute phase is less than 1 minute. In embodiments, the temperature and residence time in the thermal desorption zone are sufficient to produce the treated drill cuttings having less than or equal to about 3 wt %, or 2 wt %, or 1 wt %, or 0.5 wt % residual oil and having a moisture content of less than or equal to about 3 wt %, or 2 wt %, or 1 wt %, or 0.5 wt %.

Representative chemical and/or thermal processes suitable to produce treated drill cuttings for use herein include the methods and equipment disclosed in U.S. Pat. Nos. 6,668,947, 7,690,445, 8,356,678, 8,641,895, and US20140315764, each of which is hereby incorporated by reference in its entirety.

In some embodiments, the thermally processed OBDC solids are obtained from OBDC obtained from drill cuttings used with oil based muds that may include (1) bentonite; (2) barite; (3) kerosene, diesel or other oil; (4) polymers; (5) sodium, calcium and potassium chlorides; (6) lime; and/or (7) water (invert emulsion). The inverse emulsion generally uses more oil than water. As used herein, the term "oil-based mud" also includes synthetic muds that are sometimes classified separately even though they contain appreciable amounts of hydrocarbons.

In embodiments, the roadway construction material composition comprises solid particles comprising from about 30 wt % to about 70 wt % plagioclase. In embodiments, the plagioclase comprises feldspar, and/or albite.

In embodiments, the roadway construction material composition has a particle size distribution and plasticity consistent with characterization of the particles as a silty sand (SM) according to the Unified Soil Classification System (USCS).

In an embodiment the roadway construction material composition comprises at least about 50 wt %, or 60 wt %, or 70 wt %, or 80 wt %, or 90 wt %, or 95 wt %, or 99 wt %, of the treated drill cuttings and water. In an embodiment the particulates present in the roadway construction material composition consist of, or consist essentially of treated drill cuttings and water according to embodiments disclosed herein.

In embodiments, the composition comprises less than or equal to about 50 wt %, or 40 wt %, or 30 wt %, or 20 wt %, or 10 wt %, or 5 wt %, of one or more granular additives, soil stabilizers, or a combination thereof. In embodiments, a blend of the treated drill cuttings and the additive (granular additive and/or soil stabilizer) has a particle size profile according to the following table:

| Sieve Designation (nominal opening) | Percent passing (wt %) |
| --- | --- |
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 µm) | 13-92 |
| No. 40 (420 µm) | 12-75 |
| No. 60 (250 µm) | 12-60 |
| No. 100 (0.149 mm) | 12-45 |
| No. 200 (74 µm) | 12-45. |

In embodiments, the composition may be characterized as non-hazardous as determined according to chemical standards EPA 6010 B/1996 and 7470 A/1994 of the U.S. Environmental Protection Agency (USEPA); and/or chemical standards NOM-052-SEMARNAT-2005 and NOM-053-SEMARNAT-1993 of the Mexico environmental ministry Secretariat of Environment and Natural Resources (SEMARNAT), or the like. In case of conflict, the USEPA chemical standards shall apply. In embodiments, the composition comprises a leachate level when tested in accordance with EPA 6010 B/1996 of less than 100 mg/L barium, less than 5 mg/L lead, less than 1 mg/L selenium, or a combination thereof.

In embodiments the composition comprises, consists of, or consists essentially of treated drill cuttings, water, wherein the water is present in an amount sufficient to form a composition having a CBR of at least about 60. In embodiments, the water is present in an amount sufficient to produce a composition having a CBR of greater than or equal to about 70, or 80, or 90, or 100, as determined according to ASTM D 1883, as determined according to ASTM D 4429, or both.

In embodiments, the composition comprises water (i.e., a moisture content) from about 5 wt % to about 30 wt %, or 10 wt % to about 20 wt %. In embodiments the water content is about 12 wt % to about 16 wt %.

In embodiments, the composition may further comprise one or more additives, soil stabilizers, fibers, and the like, such that the composition has a CBR of at least about 60, or 70, or 80, or 90, or 100, as determined according to ASTM D 1883, as determined according to ASTM D 4429, or both.

In embodiments the composition comprises from about 0.01 wt % to about 10 wt % fibers. In embodiments, the composition comprises greater than or equal to about 0.1 wt %, or 0.5 wt %, or 1 wt %, or 2 wt %, or 3 wt %, or 4 wt %, fibers, and less than or equal to about 10 wt %, or 8 wt %, or 6 wt %, or 5 wt % fibers. In embodiments, the fibers have lengths ranging from about 0.5 or 1 cm to 40 cm, and a thickness from about 0.15 mm to 1.0 mm. In embodiments, an aspect ratio of the fibers, defined as a longest lineal dimension (i.e., the length) divided by a shortest lineal dimension (i.e., the width) of the fiber, is at least about 10. In embodiments, the fibers comprise polyethylene terephthalate, or recycled polyethylene terephthalate, bamboo, coconut, palm, sisal, jute, or combinations thereof.

In embodiments, the composition comprises an amount of cement suitable to produce a CBR of at least about 100. In embodiments, the cement is present in the composition from about 0.5 to about 7 wt % based on the total weight of the composition.

Accordingly, the invention provides the following embodiments:

E1. A composition comprising: treated drill cuttings having a particle size distribution and plasticity characterization of a silty sand (SM), determined according to the Unified Soil Classification System (USCS); and a moisture content sufficient to form a California Bearing Ratio (CBR) of at least about 60, determined according to ASTM D 1883 or ASTM D 4429.

E2. The composition according to embodiment E1, wherein the treated drill cuttings comprise from about 30 to about 70 wt % plagioclase.

E3. The composition according to embodiment E1 or E2, wherein the plagioclase is feldspar.

E4. The composition according to any one of embodiments E1 to E3, wherein the plagioclase is albite.

E5. The composition according to any one of embodiments E1 to E4, having a moisture content of about 10 to 20 wt %.

E6. The composition according to any one of embodiments E1 to E5, having a moisture content of about 12 to 16 wt %.

E7. The composition according to any one of embodiments E1 to E6, consisting essentially of the treated drill cuttings and water.

E8. The composition according to any one of embodiments E1 to E7, having a California Bearing Ratio (CBR) of at least about 60 as determined according to ASTM D 1883 or ASTM D 4429.

E9. The composition according to any one of embodiments E1 to E8, further comprising less than about 50 wt % of a granular additive.

E10. The composition according to any one of embodiments E1 to E9, having a particle size distribution according to the following table:

| Sieve Designation (nominal opening) | Percent passing (wt %) |
| --- | --- |
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |
| No. 60 (250 μm) | 12-60 |
| No. 100 (0.149 mm) | 12-45 |
| No. 200 (74 μm) | 12-45 |

E11. The composition according to any one of embodiments E1 to E10, wherein the treated drill cuttings comprise a processing history comprising contact with a concentrated mineral acid, direct heating in contact with a combustion gas at a temperature above about 200° C., or a combination thereof.

E12. The composition according to any one of embodiments E1 to E11, wherein the treated drill cuttings are recovered from a process comprising contacting oil bearing drill cuttings with a mineral acid to form a peptizate, followed by thermally treating the peptizate by direct contact with a combustion effluent gas having less than 1 vol % oxygen, at a temperature greater than or equal to about 200° C. under agitation and for a period of time sufficient to form a light phase comprising oil vapor and a solid phase from which the treated drill cuttings are recovered.

E13. The composition according to any one of embodiments E1 to E12, comprising a leachate level when tested in accordance with EPA 6010 B/1996 of less than 100 mg/L barium, less than 5 mg/L lead, less than 1 mg/L selenium, or a combination thereof.

E14. The composition according to any one of embodiments E1 to E13, further comprising from 0.01 to 10 wt % of a soil stabilizer, and having a CBR of at least about 80, determined according to ASTM D 1883 or ASTM D 4429.

E15. The composition according to any one of embodiments E1 to E14, further comprising lime, fly ash, pozzolan cement, or a combination thereof, and having a CBR of at least about 100, determined according to ASTM D 1883 or ASTM D 4429.

E16. The composition according to any one of embodiments E1 to E15, further comprising about 0.01 to about 5 wt % fibers.

E17. The composition according to embodiment E16, wherein the fibers have a length from about 1 to 40 cm and an aspect ratio of at least about 10.

E18. The composition according to embodiment E16 or E17, wherein the fibers comprise polyethylene terephthalate, bamboo, coconut, palm, sisal, jute, or combinations thereof.

E19. A roadway comprising a composition comprising treated drill cuttings having a particle size distribution and plasticity characterization of a silty sand (SM), determined according to the Unified Soil Classification System (USCS); and a moisture content sufficient to form a California Bearing Ratio (CBR) of at least about 60, determined according to ASTM D 1883 or ASTM D 4429.

E20. The roadway according to embodiment E19, wherein a sub-base course, a base course, or both comprise the composition.

E21. The roadway according to embodiment E19 or E20, wherein a sub-base course, a base course, or both consist essentially of the composition.

E22. A method, comprising:
providing an amount of treated drill cuttings having a particle size distribution and plasticity characterization of a silty sand (SM), determined according to the Unified Soil Classification System (USCS);
adding an amount of water to the treated drill cuttings sufficient to form a composition having a California Bearing Ratio (CBR) of at least about 60, determined according to ASTM D 1883 or ASTM D 4429.

E23. The method according to embodiment E22, further comprising blending the treated drill cuttings with less than about 50 wt % of a granular additive, wherein the composition has a particle size distribution according to the following table:

| Sieve Designation (nominal opening) | Percent passing (wt %) |
| --- | --- |
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |
| No. 60 (250 μm) | 12-60 |
| No. 100 (0.149 mm) | 12-45 |
| No. 200 (74 μm) | 12-45 |

E24. The method according to embodiment E22 or E23, further comprising blending the treated drill cuttings with from about 0.01 to 10 wt % of a soil stabilizer, wherein the composition has a CBR of at least about 80, determined according to ASTM D 1883 or ASTM D 4429.

E25. The method according to any one of embodiments E22 to E24, wherein the soil stabilizer comprises lime, fly ash, pozzolan cement, or a combination thereof, and wherein the CBR is at least about 100.

E26. The method according to any one of embodiments E22 to E25, further comprising blending the treated drill cuttings with from about 0.01 to 5 wt % fibers.

E27. The method according to embodiment E26, wherein the fibers have a length from about 1 to 40 cm and an aspect ratio of at least about 10.

E28. The method according to embodiment E26 or E27, wherein the fibers comprise polyethylene terephthalate, bamboo, coconut, palm, sisal, jute, or a combination thereof.

E29. The method according to any one of embodiments E26 to E28, wherein the treated drill cuttings are recovered from a process comprising contacting oil bearing drill cuttings with a mineral acid to form a peptizate, followed by thermally treating the peptizate by direct contact with a combustion effluent gas at a temperature greater than or equal to about 200° C. under agitation for a period of time sufficient to form a light phase comprising oil vapor and a dense phase from which the treated drill cuttings are recovered.

E30. The method according to any one of embodiments E26 to E29, further comprising disposing the composition in a roadway construct.

E31. The method according to embodiment E30, further comprising compacting the composition in the roadway construct to form a base course, a sub-base course, or a combination thereof.

E32. The method according to any one of embodiments E26 to E31, wherein the composition meets the particle size distribution range requirements according to Garnica, Gomez, and Sesma.

E32. The composition according to any one of embodiments E1 to E25, wherein the composition meets the particle size distribution range requirements according to Garnica, Gomez, and Sesma.

EXAMPLES

Example 1—Analysis of Treated and Untreated Drill Cutting Solids

An analysis of the mineral content of oil-based drill cuttings was conducted by grinding samples in an agate mortar to a size less than −200 mesh and X-ray fluorescence using a PHILIPS model X'pert PW3040 diffractometer. Raw untreated oil-based drill cuttings; the drill cuttings pretreated with sulfuric acid in the peptizer 38 of FIG. 2 as described in U.S. Pat. No. 8,641,895; drill cutting solids thermally processed with hot combustion gases in the thermal desorption zone 48 and recovered from the outlet 56 of FIG. 2 as described in U.S. Pat. No. 8,641,895; and drill cutting solids thermally processed with hot combustion gases in the thermal desorption zone 48 and recovered from the vapor recovery system 60 of FIG. 2 via the bottom of the cyclone 150, as described in U.S. Pat. No. 8,641,895, which is hereby incorporated herein by reference in its entirety, were tested. The results are shown in Table 1A.

TABLE 1A

Content of Selected Elements in Treated, Pretreated and Untreated Drill Cuttings

| Element | Untreated OBDC (wt %) | Acid-pretreated OBDC (wt %) | Thermally Treated OBDC (Dense Phase Solids) (wt %) | Thermally Treated OBDC (Lean Phase Fines) (wt %) |
|---|---|---|---|---|
| Pb | 0.349 | 0.290 | 0.276 | 0.570 |
| Sr | 1.21 | 1.07 | 0.912 | 0.930 |
| K | 1.25 | 1.24 | 1.13 | 1.03 |
| Cl | 0.015 | 0.018 | 0.015 | 0.004 |
| Na | 1.53 | 1.45 | 1.21 | 0.594 |
| Mg | 1.50 | 1.48 | 1.22 | 1.27 |
| Fe | 3.29 | 3.27 | 3.15 | 3.91 |
| Al | 4.49 | 4.30 | 3.98 | 4.25 |
| S | 3.43 | 5.75 | 3.85 | 4.10 |
| Ca | 11.1 | 10.7 | 11.3 | 8.35 |
| Ba | 16.1 | 14.2 | 10.0 | 15.6 |
| Si | 13.2 | 13.0 | 11.6 | 11.5 |

The dense phase solids and the fines materials were also analyzed by leachate analysis, and the results are presented in Table 1B.

TABLE 1B

Content of Minerals in the Crystalline Phase of Treated Drill Cuttings

| Mineral | Thermally Treated OBDC (Dense Phase Solids Recovered from Reactor) (wt % crystal phase) | Thermally Treated OBDC (Lean Phase Fines Recovered from Cyclone) (wt % crystal phase) |
|---|---|---|
| BaSO4 | 17 | 15 |
| SiO2 | 8 | 4 |
| CaCO3 | 27 | 16 |
| CaSO4 | 8 | 4 |
| Albite | 40 | 64 |

The crystalline phase was also examined by scanning electron microscopy (SEM) for grain size ranges, which are presented in Table 1C.

TABLE 1C

Grain Size of Minerals in the Crystalline Phase of Treated Drill Cuttings

| Mineral | Thermally Treated OBDC (Dense Phase Solids Recovered from Reactor) (minimum to maximum) | Thermally Treated OBDC (Lean Phase Fines Recovered from Cyclone) (minimum to maximum) |
|---|---|---|
| BaSO4 | 0.5-45 μm | 0.5-45 μm |
| SiO2 | 37-500 μm | 37-45 μm |
| CaCO3 | 45-100 μm | 45-100 μm |
| CaSO4 | 1-37 μm | 1-10 μm |
| Albite | 0.25-350 μm | 0.25-35 μm |

These data show that the OBDC solids contain relatively small amounts of barium, lead, and selenium. However, when tested in accordance with EPA 6010 B/1996, the respective leachate from each of the OBDC solids was below allowable limits for barium (100 mg/L), lead (5 mg/L) and selenium (1 mg/L). The fluctuation of sulfur content can be attributed to sulfuric acid addition in the pretreatment and differential volatilization between the lean and dense phases of the thermally treated OBDC.

Example 2—Soil Classification Testing

The particle size distribution classification or granulometric testing was conducted according to the Unified Soil Classification System (UCS) for the dense phase solids of the thermally treated OBDC of Example 1. The results are shown in Table 2 below.

In addition, an attempt to perform Atterberg limit tests indicated that the material was not plastic and exhibited linear shrinkage, atypical of clay. These results indicate that the treated drill cuttings have the characteristics of a silty sand (SM designation per USCS), since plasticity was less than 4, more than 50% passed through the No. 4 mesh and more than 12% passed through the No. 200 mesh. This was an unexpected result since drill cutting waste is generally considered to have a high clay content comprised of hydrated aluminum silicates, which give properties of high plastic viscosity and water retention, which are undesirable for base and sub-base courses.

TABLE 2

Particle Size Distribution of Treated Drill Cuttings (Dense Phase)

| Sieve Designation (nominal opening) | Retained weight (g) | Percent retained (wt %) | Cumulative retained (wt %) | Percent passing (wt %) |
| --- | --- | --- | --- | --- |
| 1 in. (25.4 mm) | 0 | 0.00 | 0.00 | 100.00% |
| 0.75 in. (19 mm) | 0 | 0.00 | 0.00 | 100 |
| 0.5 in. (12.7 mm) | 0 | 0.00 | 0.00 | 100 |
| 0.375 in. (9.51 mm) | 7.1 | 0.70 | 0.70 | 99.3 |
| No. 4 (4.76 mm) | 66.1 | 6.47 | 7.17 | 92.8 |
| No. 10 (2 mm) | 135 | 13.2 | 20.4 | 79.6 |
| No. 20 (841 µm) | 100 | 9.8 | 30.2 | 69.8 |
| No. 40 (420 µm) | 135 | 13.2 | 43.4 | 56.6 |
| No. 60 (250 µm) | 102 | 9.94 | 53.4 | 46.6 |
| No. 100 (0.149 mm) | 97.8 | 9.57 | 62.9 | 37.1 |
| No. 200 (74 µm) | 116 | 11.4 | 74.3 | 25.7 |
| <200 (<74 µm) | 263 | 25.7 | 100% | 0.00 |

Example 3—Proctor Testing and California Bearing Ratio (CBR)

The Proctor test was performed in accordance with AASHTO T 99 (standard Proctor test) to determine the optimal moisture content and maximum compacting density. In this test the sample is moisturized, compacted and then dried to determine the moisture content that gives the highest dry compaction density. The results are presented in Table 3.

TABLE 3

Proctor Testing on 70 wt % Cuttings/30 wt % River Sand

| Moisture Content (wt %): | 8 | 10 | 12 | 14 | 16 | 18 |
| --- | --- | --- | --- | --- | --- | --- |
| Wet soil weight (g) | 1846 | 1871 | 1940 | 2026 | 2042 | 2014 |
| Wet density (g/mL) | 1.97 | 1.99 | 2.07 | 2.16 | 2.18 | 2.15 |
| Dry density (g/mL) | 1.81 | 1.80 | 1.82 | 1.86 | 1.83 | 1.72 |

Based on these results, it was determined that 14 wt % water gave the best compaction density. The CBR based on the treated drill cuttings mixed with water to a mixture having a 14 wt % water content was 61.5, indicating that the material could be used as the sole component to provide suitability for a sub-base course.

The treated drill cutting material was then mixed thoroughly with river sand from the Tabasco, Mexico, region at a dry weight ratio of 70:30 drill cuttings:river sand, and the Proctor test indicated a maximum compaction density of 1.92 g/mL at 12% moisture. However, the 70:30 cuttings-sand blend only had a CBR of 5.77, indicating the mixture was unsuitable as a sub-base course material. At a 50-50 cuttings to sand ratio (dry), the Proctor test showed a maximum compaction density at 10 wt % moisture of 1.94 g/mL, and the observation of deformation of this material with a light touch gave a clear indication that this mixture had an even worse support value and so the CBR was not determined.

These results indicate that when used as a roadway material in the sub-base, base, or cap courses, the material in various embodiments may comprise more than 70 wt % of the treated drill cutting material, more than 75 wt % of the treated drill cutting material, more than 80 wt % of the treated drill cutting material more than 85 wt % of the treated drill cutting material, more than 90 wt % of the treated drill cutting material, more than 95 wt % of the treated drill cutting material, and/or may consist essentially of the treated drill cutting material, i.e., comprising relatively small amounts of any impurities or additive materials in addition to the treated drill cutting material that would not reduce the CBR to less than 60 at the maximum Proctor compaction density. In some embodiments, the amount of additive(s), if present, does not change the maximum Proctor compaction density outside the range of 1.85-1.92 g/mL, and/or decrease the moisture content corresponding to the maximum Proctor compaction density to less than 12 wt %.

Example 4—Polyethylene Terephthalate (PET) Fiber Addition

The treated drill cuttings (dense phase) from Examples 1-3 above were mixed with 0.3 wt % recycled PET fibers from beverage containers having a length of 4 cm, based on the dry weight of the mixture of drill cuttings and PET fibers, i.e., a weight ratio of 99.7:0.3, for Proctor testing. The results are presented in Table 4.

TABLE 4

Proctor Testing on 99.7 wt % Cuttings/0.3 wt % PET Fibers

| Moisture Content (wt %): | 10 | 12 | 14 | 16 |
| --- | --- | --- | --- | --- |
| Wet soil weight (g) | 1927 | 1970 | 2022 | 1933 |
| Wet density (g/mL) | 2.05 | 2.10 | 2.15 | 2.06 |
| Dry density (g/mL) | 1.84 | 1.84 | 1.85 | 1.73 |

Based on these results, it was determined that 14 wt % water gave the best compaction density, essentially unchanged from 100% drill cuttings in Example 3. The CBR of the mixture at this moisture level, however, was improved to 88.9, indicating that the mixture could also be used as a base course in addition to use as a sub-base course.

Example 5—Bamboo Fiber Addition

The treated drill cuttings (dense phase) from Examples 1-3 above were mixed with 0.3 wt % bamboo fibers, based on the dry weight of the mixture of drill cuttings and bamboo fibers, i.e., a weight ratio of 99.7:0.3, for Proctor testing. The results are presented in Table 5.

TABLE 5

| Proctor Testing on 99.7 wt % Cuttings/0.3 wt % Bamboo Fibers | | | |
|---|---|---|---|
| Moisture Content (wt %): | 14 | 16 | 18 |
| Wet soil weight (g) | 1974 | 2008 | 1990 |
| Wet density (g/mL) | 2.10 | 2.14 | 2.12 |
| Dry density (g/mL) | 1.85 | 1.84 | 1.78 |

The mixture was not tested at lower moisture contents because the cohesion of the mixture was poor. Based on these results, it was determined that 14 wt % water again gave the best compaction density, essentially unchanged from 100% drill cuttings in Example 3. The CBR of the mixture at this moisture level, however, was essentially unchanged at 61.3, indicating that the mixture was still suitable for use as a sub-base course.

The cohesion forces of the bamboo fibers were apparently less than those of the PET fibers, which in this example lowered load transfer values relative to PET fibers. It is possible that this result might be explained by relatively poor water resistance of bamboo, and by the fact that the bamboo fibers had a higher density than PET, leading to a lower volume of bamboo and lower contact area between the drill cuttings and the bamboo fibers. Other natural fibers that may be equivalent or superior to bamboo include, coconut, palm, sisal, jute, and the like, including combination, any of which may be coated with a hydrophobic material such as, for example, phenol, creosote, bitumen, resin, etc.

Example 6—Portland Cement Addition

The treated drill cuttings (dense phase) from Examples 1-5 above were mixed with 7 wt % Portland cement, based on the dry weight of the mixture of drill cuttings and Portland cement, i.e., a weight ratio of 93:7, for Proctor testing. The results are presented in Table 6.

TABLE 6

| Proctor Testing on 97 wt % Cuttings/7 wt % PET Fibers | | | | |
|---|---|---|---|---|
| Moisture Content (wt %): | 12 | 14 | 16 | 18 |
| Wet soil weight (g) | 1950 | 2082 | 2050 | 2093 |
| Wet density (g/mL) | 2.08 | 2.21 | 2.18 | 2.23 |
| Dry density (g/mL) | 1.83 | 1.91 | 1.84 | 1.83 |

Based on these results, it was determined that 14 wt % water again gave the best compaction density. The CBR of the mixture at this moisture level, however, was improved to 110, indicating that the mixture could also be used as an excellent base course in addition to use as a sub-base course.

Example 7—BASE SEAL Polymer Addition

The treated drill cuttings (dense phase) from Examples 1-6 above were mixed with 9 wt % BASE SEAL BS-100 liquid polymer soil stabilizer (obtained from Base-Seal International Inc.) and diluted with water in an amount equivalent to 12% of the mixture. At 12 wt % moisture, the CBR of the mixture was 76.4, indicating that the mixture could be used as a sub-base course.

All documents described herein are incorporated by reference herein for purposes of all jurisdictions where such practice is allowed, including any priority documents, related application and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. For example, parts and elements of one embodiment may be used in combination with those of another, or any subcombination of parts and elements of the embodiments may be used separately and apart from all parts and elements discussed or shown in connection with any particular embodiment. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

What is claimed is:

1. A composition comprising
   treated drill cuttings having a particle size distribution and plasticity characterization of a silty sand (SM), determined according to the Unified Soil Classification System (USCS), wherein the treated drill cuttings comprise from about 30 to about 70 wt % plagioclase; and
   a moisture content sufficient to form a California Bearing Ratio (CBR) of at least about 60, determined according to ASTM D 1883 or ASTM D 4429.

2. The composition of claim 1, having a moisture content of about 12 to 16 wt %.

3. The composition of claim 1, consisting essentially of the treated drill cuttings and water.

4. The composition of claim 1, wherein the treated drill cuttings comprise a processing history comprising contact with a concentrated mineral acid, direct heating in contact with a combustion gas at a temperature above about 200° C., or a combination thereof.

5. The composition of claim 1, wherein the treated drill cuttings are recovered from a process comprising contacting oil bearing drill cuttings with a mineral acid to form a peptizate, followed by thermally treating the peptizate by direct contact with a combustion effluent gas at a temperature greater than or equal to about 200° C. under agitation and for a period of time sufficient to form a light phase comprising oil vapor and a dense phase from which the treated drill cuttings are recovered.

6. The composition of claim 1, comprising a leachate level when tested in accordance with EPA 6010 B/1996 of less than 100 mg/L barium, less than 5 mg/L lead, less than 1 mg/L selenium, or a combination thereof.

7. The composition of claim 1, further comprising from 0.01 to 10 wt % of a soil stabilizer, and having a CBR of at least about 80, determined according to ASTM D 1883 or ASTM D 4429.

8. The composition of claim 1, further comprising lime, fly ash, pozzolan cement, or a combination thereof, and having a CBR of at least about 100, determined according to ASTM D 1883 or ASTM D 4429.

9. The composition of claim 1, further comprising about 0.01 to about 5 wt % fibers.

10. The composition of claim 9, wherein the fibers have a length from about 1 to 40 cm and an aspect ratio of at least about 10.

11. The composition of claim 9, wherein the fibers comprise polyethylene terephthalate, bamboo, coconut, palm, sisal, jute, or combinations thereof.

12. The composition of claim 1, further comprising less than about 30 wt % of a granular additive, and wherein the composition has a particle size distribution as follows:

| Sieve Designation (nominal opening) | Percent passing (wt %) |
|---|---|
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |
| No. 60 (250 μm) | 12-60 |
| No. 100 (0.149 mm) | 12-45 |
| No. 200 (74 μm) | 12-45 |

13. A roadway comprising a sub-base course, a base course, or both consisting essentially of the composition of claim 12.

14. A roadway comprising a sub-base course, a base course, or both consisting essentially of the composition of claim 1.

15. A method, comprising:
providing an amount of treated drill cuttings having a particle size distribution and plasticity characterization of a silty sand (SM), determined according to the Unified Soil Classification System (USCS);
blending the treated drill cuttings with less than about 30 wt % of a granular additive; and
adding an amount of water to the treated drill cuttings sufficient to form a composition having a California Bearing Ratio (CBR) of at least about 60, determined according to ASTM D 1883 or ASTM D 4429;
wherein the composition has a panicle size distribution as follows:

| Sieve Designation (nominal opening) | Percent passing (wt %) |
|---|---|
| 3 in. (76.2 mm) | 100 |
| 2 in. (50.8 mm) | 85-100 |
| 1.5 in. (38.1 mm) | 75-100 |
| 1 in. (25.4 mm) | 62-100 |
| 0.75 in. (19 mm) | 54-100 |
| 0.375 in. (9.51 mm) | 50-100 |
| No. 4 (4.76 mm) | 50-100 |
| No. 10 (2 mm) | 21-100 |
| No. 20 (841 μm) | 13-92 |
| No. 40 (420 μm) | 12-75 |

-continued

| Sieve Designation (nominal opening) | Percent passing (wt %) |
|---|---|
| No. 60 (250 μm) | 12-60 |
| No. 100 (0.149 mm) | 12-45 |
| No. 200 (74 μm) | 12-45. |

16. The method of claim 15, further comprising blending the treated drill cuttings with from about 0.01 to 10 wt % of a soil stabilizer, wherein the composition has a CBR of at least about 80, determined according to ASTM D 1883 or ASTM D 4429.

17. The method of claim 16, wherein the soil stabilizer comprises lime, fly ash, pozzolan cement, or a combination thereof, and wherein the CBR is at least about 100.

18. The method of claim 16, further comprising blending the treated drill cuttings with from about 0.01 to 5 wt % fibers.

19. The method of claim 18, wherein the treated drill cuttings are recovered from a process comprising contacting oil bearing drill cuttings with a mineral acid to form a peptizate, followed by thermally treating the peptizate by direct contact with a combustion effluent gas at a temperature greater than or equal to about 200° C. under agitation for a period of time sufficient to form a light phase comprising oil vapor and a dense phase from which the treated drill cuttings are recovered.

20. The method of claim 19, further comprising disposing the composition in a roadway construct.

21. The method of claim 20, further comprising compacting the composition in the roadway construct to form a base course, a sub-base course, or a combination thereof.

22. A composition comprising
treated drill cuttings having a particle size distribution and plasticity characterization of a silty sand (SM), determined according to the Unified Soil Classification System (USCS), wherein the treated drill cuttings comprise a processing history comprising contact with a concentrated mineral acid, direct heating in contact with a combustion gas at a temperature above about 200° C., or a combination thereof; and
a moisture content sufficient to form a California Bearing Ratio (CBR) of at least about 60, determined according to ASTM D 1883 or ASTM D 4429.

23. The composition of claim 22, further comprising from 0.01 to 10 wt % of a soil stabilizer comprising lime, fly ash, pozzolan cement, or a combination thereof, wherein the composition has a CBR of at least about 100, determined according to ASTM D 1883 or ASTM D 4429.

24. The composition of claim 22, further comprising about 0.01 to about 5 wt % fibers comprising polyethylene terephthalate, bamboo, coconut, palm, sisal, jute, or a combination thereof, wherein the fibers have a length from about 1 to 40 cm and an aspect ratio of at least about 10.

* * * * *